United States Patent
Foldes

(10) Patent No.: US 6,168,741 B1
(45) Date of Patent: Jan. 2, 2001

(54) MOULDED FOOTWEAR

(76) Inventor: Peter Foldes, Beaufort House, Collyeweston, Stamford PE9 3PW (GB)

(*) Notice: Under 35 U.S.C. 154(b), the term of this patent shall be extended for 0 days.

(21) Appl. No.: 09/194,819

(22) PCT Filed: Jun. 4, 1997

(86) PCT No.: PCT/GB97/01504
§ 371 Date: Dec. 3, 1998
§ 102(e) Date: Dec. 3, 1998

(87) PCT Pub. No.: WO97/46371
PCT Pub. Date: Dec. 11, 1997

(30) Foreign Application Priority Data

Jun. 5, 1996 (GB) .................................................... 9611763

(51) Int. Cl.⁷ .................................................. B29D 31/50
(52) U.S. Cl. .................... 264/244; 425/129.2; 425/577; 425/119
(58) Field of Search ................................. 264/244, 273, 264/275, 278; 425/129.2, 577, 119, 125, 126.2

(56) References Cited

U.S. PATENT DOCUMENTS

| | | | |
|---|---|---|---|
| 1,432,469 | * 10/1922 | Klein et al. | 264/244 |
| 2,903,748 | * 9/1959 | Doherty | 264/244 |
| 3,920,610 | * 11/1975 | Wagner | 264/244 |
| 4,244,070 | * 1/1981 | Ughi | 264/244 |
| 4,276,254 | * 6/1981 | Combronde | 264/244 |
| 4,505,660 | 3/1985 | Seidel et al. | 425/129 S |
| 4,651,444 | * 3/1987 | Ours | 264/244 |
| 4,778,368 | 10/1988 | Rebers et al. | 425/119 |
| 5,667,738 | * 9/1997 | Krajcir | 264/244 |

FOREIGN PATENT DOCUMENTS

| | | |
|---|---|---|
| 1 704 257 | 4/1971 | (DE). |
| 971 810 | 10/1964 | (GB). |
| 1 121 764 | 7/1968 | (GB). |
| 1 242 216 | 8/1971 | (GB). |
| 1 257 633 | 12/1971 | (GB). |
| 1 292 516 | 10/1972 | (GB). |
| 1 335 368 | 10/1973 | (GB). |
| 1 563 997 | 4/1980 | (GB). |

OTHER PUBLICATIONS

British Search Report for Application No. GB 9711495.3, dated Sep. 26, 1997 (1 page).
International Search Report for PCT/GB97/01504, dated Oct. 27, 1997 (2 pages).

* cited by examiner

Primary Examiner—Angela Ortiz

(57) ABSTRACT

A mould (14) for manufacturing an article of footwear comprises two mould halves (16); a hollow last (20) which includes a cylindrical downwardly open opening (30) at its foot end (26); and a first sole plate (34) which includes a projection (32) having a head portion (36) which is arranged to extend into the opening (30) in the last (20) in order to restrict movement of the last within the mould. Polyurethane is injected into cavity (44) defined between the last and mould halves (16)/sole plate (34) to form an inner sole of an article of footwear having a hole in it in a position where projection (32) cooperated with opening (30). This opening may then be plugged prior to the formation of an outer sole using a second sole plate (which does not include a projection (32) instead of the first sole plate.

8 Claims, 9 Drawing Sheets

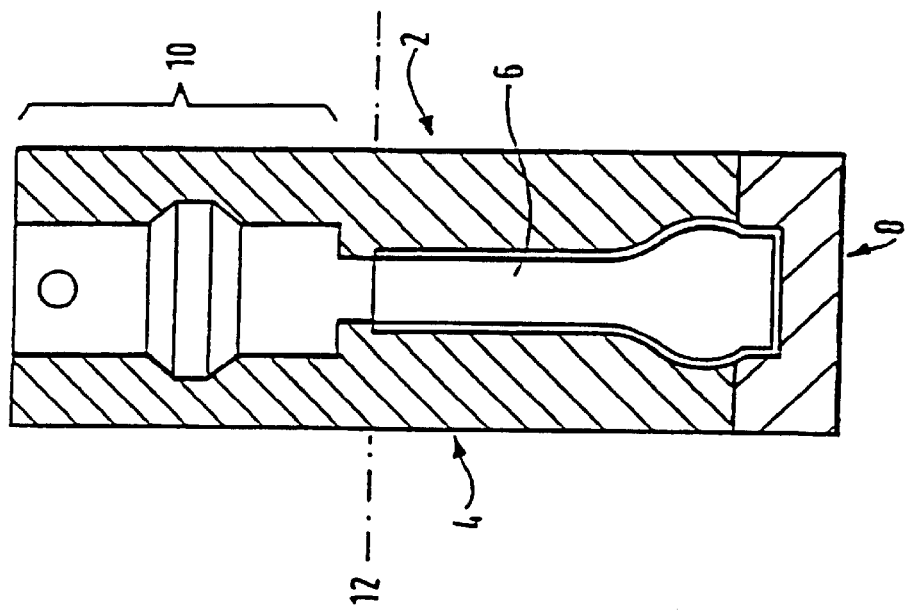
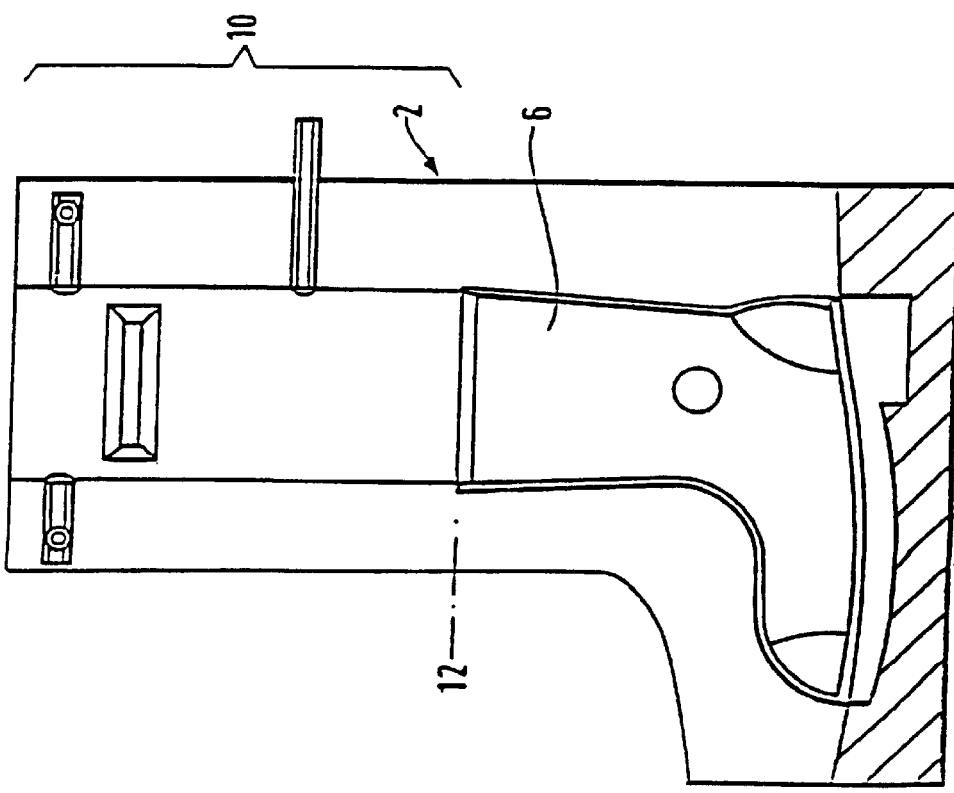

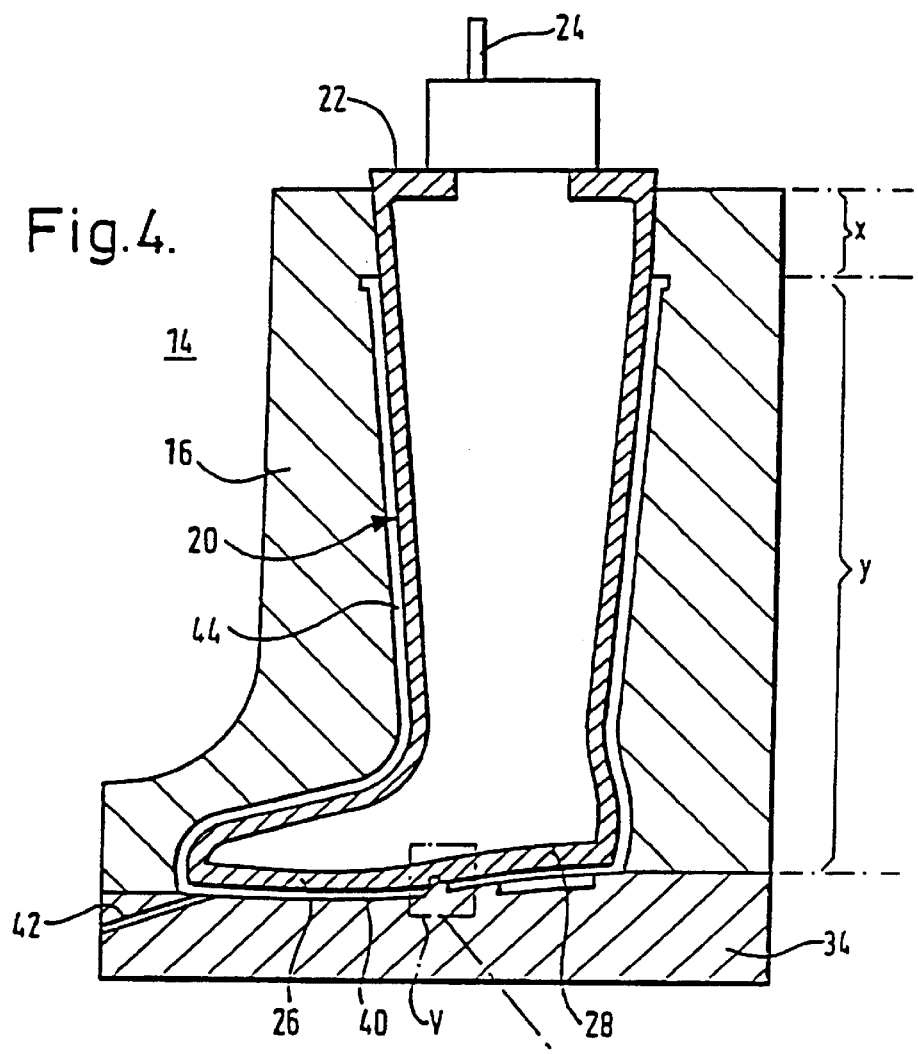
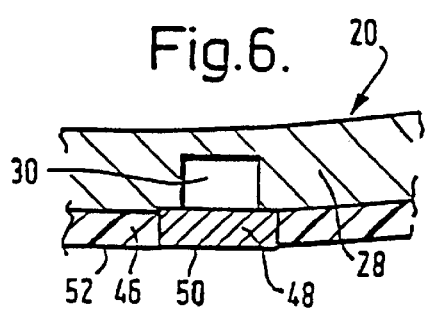
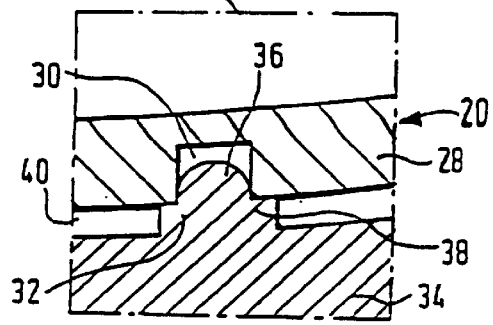

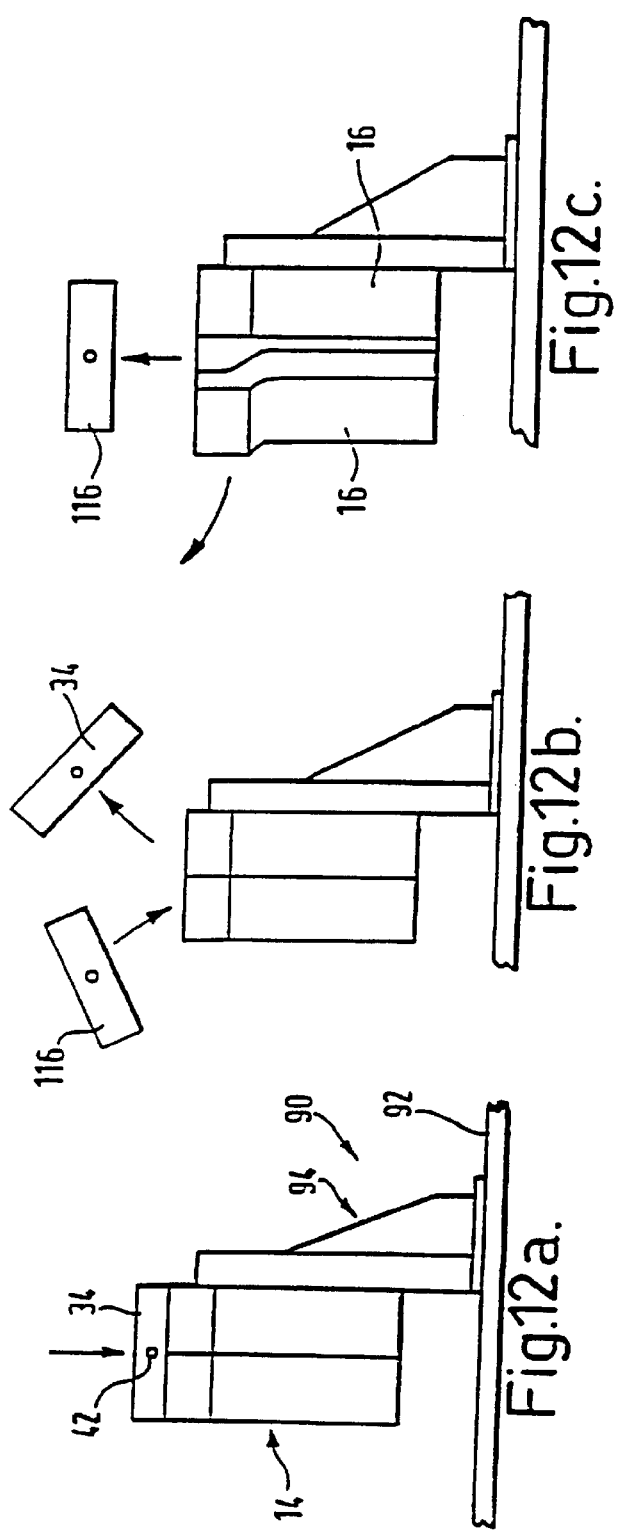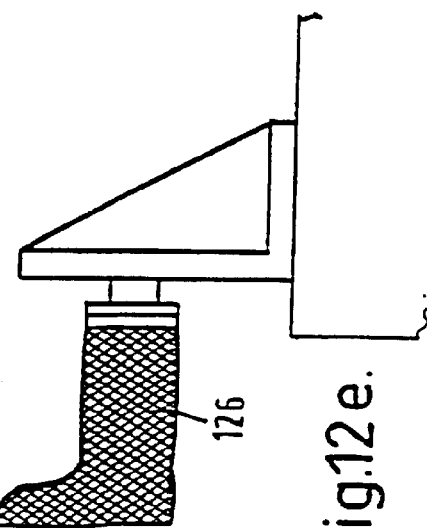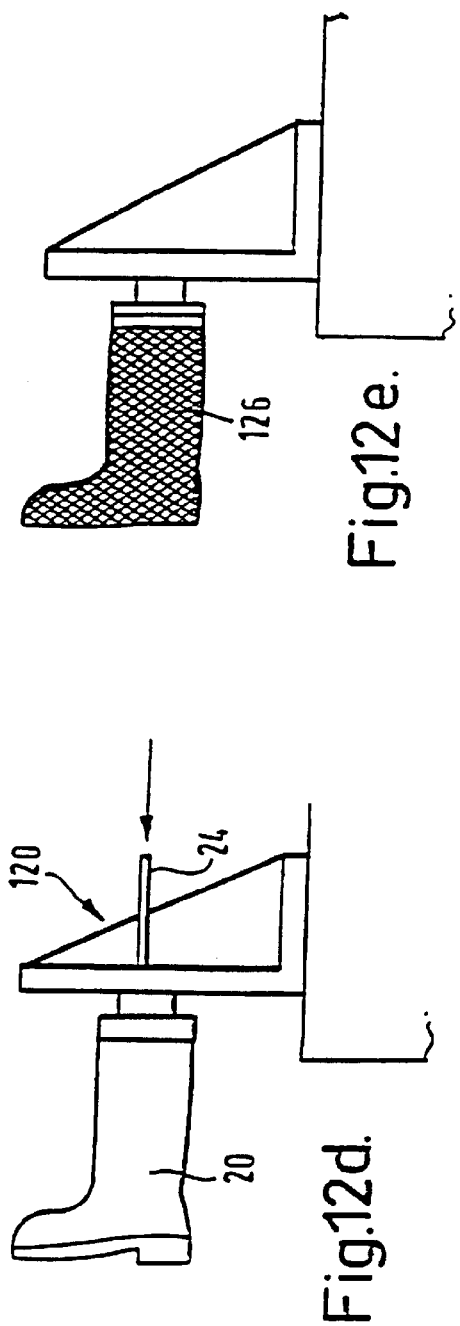

MOULDED FOOTWEAR

This invention relates to footwear and particularly, although not exclusively, relates to a mould for making an article of footwear.

A known mould for the manufacture of plastics footwear by injection moulding is shown diagrammatically in FIGS. 1 and 2 of the accompanying diagrammatic drawings wherein FIG. 1 is a schematic vertical cross-section through a mould and FIG. 2 is a schematic vertical cross-section through the mould rotated through 90° relative to FIG. 1.

Known moulds are constructed of metal or other hard, rigid materials and generally comprise four or more principal components: two mould halves 2, 4 to form a cavity of the mould; a last 6 centrally mounted within the cavity to form the core of the mould; and one or more sole plates 8 at the foot end of the mould beneath the last, to form the outsole of the article of footwear.

In order to keep the last 6 in a central position between the two mould halves 2, 4, so that both sides of an article of footwear manufactured using the mould are of equal thickness, the mould is constructed so that a considerable additional depth and thickness of material 10 is provided beyond the leg length 12 of the article of footwear to mechanically support the last 6. The last is thereby supported from only one end by a cantilever effect; however, the parts necessary for this add considerably to the size, weight and cost of the mould and, furthermore, require precise fitting and machining. Additionally, such a mould must be used with an injection moulding machine with a large and powerful press or mechanical lock that can exert sufficient clamping pressure on the parts of the mould to maintain the parts in the desired positions.

Known injection moulding machines for footwear manufacture tend to be large, complex and expensive.

It is an object of the present invention to address problems associated with the manufacture of articles of footwear.

According to one aspect of the invention, there is provided an apparatus for manufacturing a complete article of waterproof footwear by moulding, said apparatus comprising a mould and a last means arranged in a cavity defined by the mould. Restrictor means is provided between the mould and the last means for supporting the last means and for restricting relative movement between the mould and the last means, said restrictor means comprising a male or female formation provided on or by the last means arranged to be engaged by the other of a male or female formation provided on or by the mould.

Preferably, the mould includes a first sole member used to form an inner sole of the article of footwear, the first sole member being interchangeable with a second sole member which is used to form an outer sole of the article of footwear and the restrictor means comprise a projection provided on the first sole member which engages with an opening in a sole part of the last means.

Alternatively, the restrictor means comprises a rod which is housed within the last means and extensible therefrom to engage with a hole provided in the mould.

Preferably, the last means includes a generally solid foot part and a generally hollow leg part which are releasably securable to one another. This enables the last means to be more easily removable from a moulded article of footwear.

The apparatus may further comprise a mould support and a multiplicity of moulds supported thereby, wherein said moulds are pivotable relative to the mould support so that the orientation of each mould can be adjusted.

According to another aspect of the invention there is provided a method for manufacturing a complete article of waterproof footwear by moulding from polyurethane, said method comprising, in a first moulding process, manufacturing a first footwear moulding with a hole therein using a mould which includes restrictor means provided between the mould and a last means for supporting the last means and for restricting relative movement between the mould and the last means, said restrictor means comprising a male or female formation provided on or by the last means arranged to be engaged by the other of a male or female formation provided on or by the mould, which restrictor means causes the production of said hole and in a second moulding process, covering or filling said hole.

Preferably, the hole is plugged with a plug member prior to the second moulding process.

In said first moulding process a first sole member may be used to produce an inner sole of the article of footwear and in said second moulding process a second sole member which is different to said first sole member may be used to produce an outer sole of the article of footwear.

Any suitable material or materials may be used in the method. Preferably, said material is flexible after curing. It may be a plastics material or the like, with polyurethane plastics material being especially preferred or it may be a rubber material or the like.

Specific embodiments of the invention will now be described, by way of example, with reference to the accompanying diagrammatic drawings, in which:

FIG. 1 is a schematic vertical cross-section through a known mould as described above;

FIG. 2 is a schematic vertical cross-section through the mould of FIG. 1 rotated through 90° about its vertical axis;

FIG. 4 is a vertical cross-section through the mould of FIG. 3;

FIG. 5 is an enlarged view of the portion of the mould of FIG. 4 within box V;

FIG. 6 shows the portion within box V after a first injection with the sole plate removed;

Figure 13:
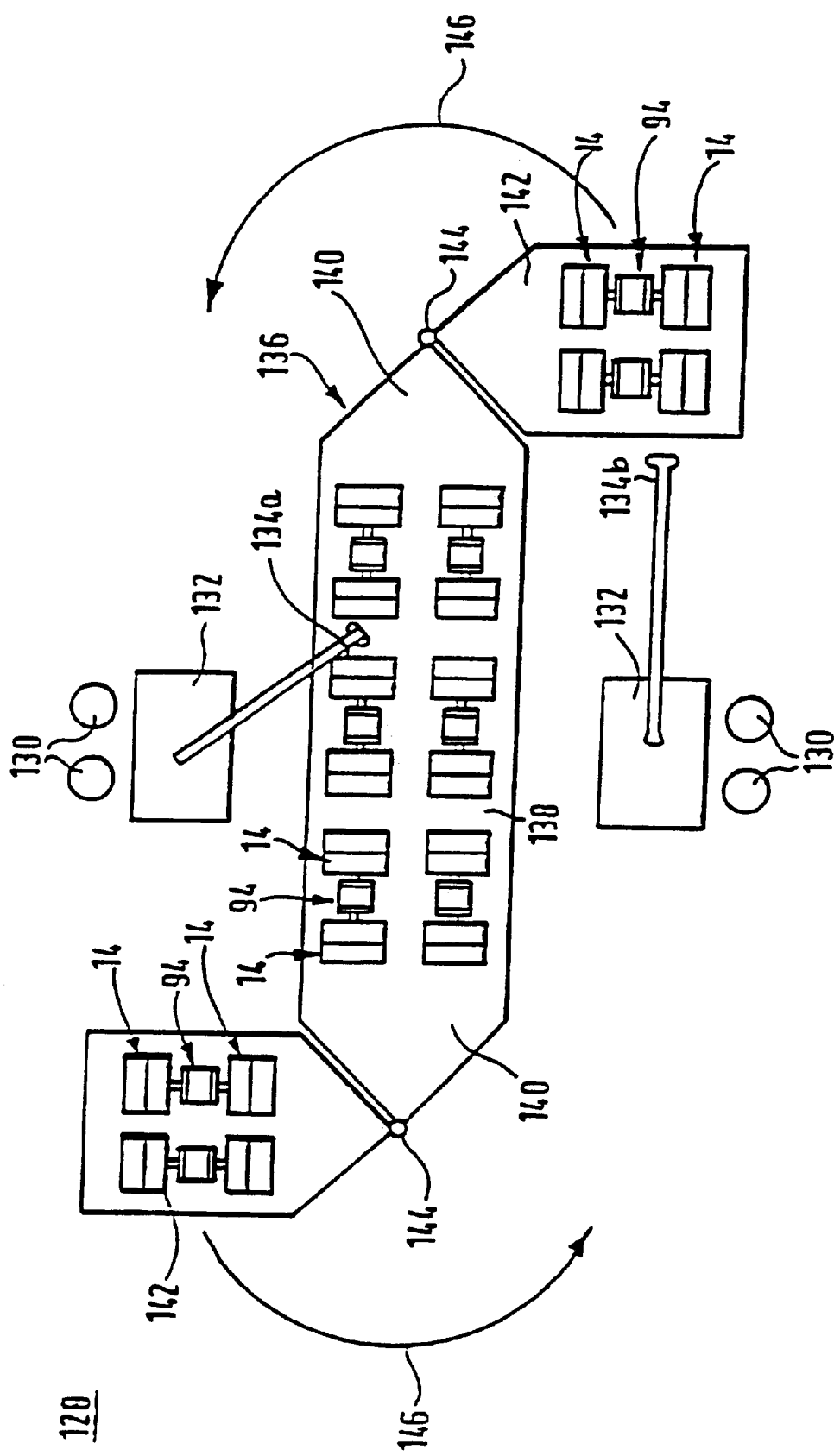

FIGS. 12(*a*) to (*e*) show stages in the manufacture of an article of footwear; and FIG. 13 is a schematic top plan view showing the layout of assembling apparatus.

In the Figures, the same or similar parts are annotated with the same reference numerals.

Figure 3:
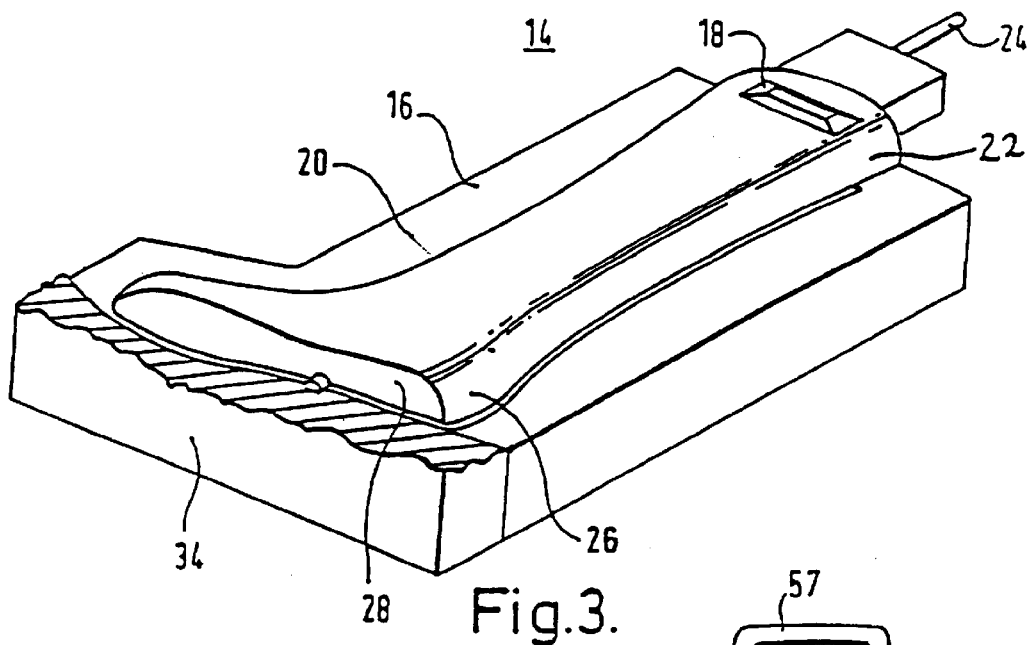
FIG. 3 is a perspective view of parts of a mould of an embodiment of the invention, with part of the sole plate of the mould cut away.

Referring to FIGS. 3 to 5, a mould 14 comprises two-mould halves 16 (only one of which is shown in the Figures) which are only longer by a distance "x" than the leg length "y" of the article of footwear to be manufactured. Each mould half 16 includes a respective slot (not shown) which is arranged to snugly receive a keyway 18 provided on a last 20.

The last 20 is hollow. At its leg and 22 it includes an air-blow off tube 24 for blowing air into the last. The last includes perforations (not shown) via which air blown in can exit for aiding removal of a moulded article from the last. At its foot end 26, a sole part 28 of the last includes a cylindrical downwardly open opening 30 which is arranged to cooperate with a projection 32 provided on an upwardly facing surface of a first sole plate 34.

The projection 32 includes a head portion 36 which in the assembled mould extends into the opening 30 and a shoulder portion 38 on which the sold part 28 is seated and supported so that gap 40 is defined between the last 20 and sole plate 34. A passageway 42 extends from a position outside the mould 14 and opens into the gap 40.

The mould 14 is assembled with the last 20 in cavity 44 defined by the two mould halves 16 and the sole plate 34. When so arranged, it should be noted that the last is supported at its leg end 22 by cooperation of the keyways 18 in the slots in the mould halves; and at its foot end 26 by engagement of the projection 32 in the opening 30 so that the last cannot move within the cavity 44. The parts of the mould 14 are clamped in position by suitable means as described hereinafter.

It should be noted that, since the last is supported at its foot end 26, the length x and the thickness and weight of mould halves 16 beyond the leg length y is small compared to the amount of material 10 required in the known mould described in FIGS. 1 and 2 and, furthermore, the force needed to clamp the parts of the mould 14 in position is less than in the FIGS. 1 and 2 embodiments.

The assembled mould 14 may be used as follows.

In general, the last 20 of the mould will be covered with a sock, in a known manner, prior to assembly of the mould. Once assembled, with the parts of the mould clamped in position, polyurethane (PU) is injected via passageway 42 into the cavity 44 defined around the last 20 until the PU fills the cavity.

After the PU has cured, the first sole plate 34 is removed. It will be appreciated that, at this stage, there will be a hole in the inner sole 46 (FIG. 6) of the moulded article of footwear in the region of the inner sole where the projection 32 engaged opening 30. This hole is plugged using a suitably dimensioned disc 48 of material (which could be fabric, wood, pressed paper or plastics material or the like) so that an outer wall 50 of the disc is substantially flush with the outer wall 52 of the sole 46 as shown in FIG. 6. The disc 48 may be 5 mm to 10 mm in diameter and is arranged to provide a barrier against penetration by PU in subsequent steps.

Next, a second sole plate (not shown) is placed in position. The second sole plate does not include a projection 32 or opening 30 and, accordingly, the last 20 is not supported at its foot end in the same manner as when the first sole plate is in position. However, it is found that with the second sole plate in position the last is sufficiently supported by the PU material which fills the cavity between the last and the two mould halves 16. Then, PU is injected into the mould to form an outer sole around the inner sole 46. The outer sole formed covers the plug 48 which is, therefore, not visible in the finished article.

Figure 7:
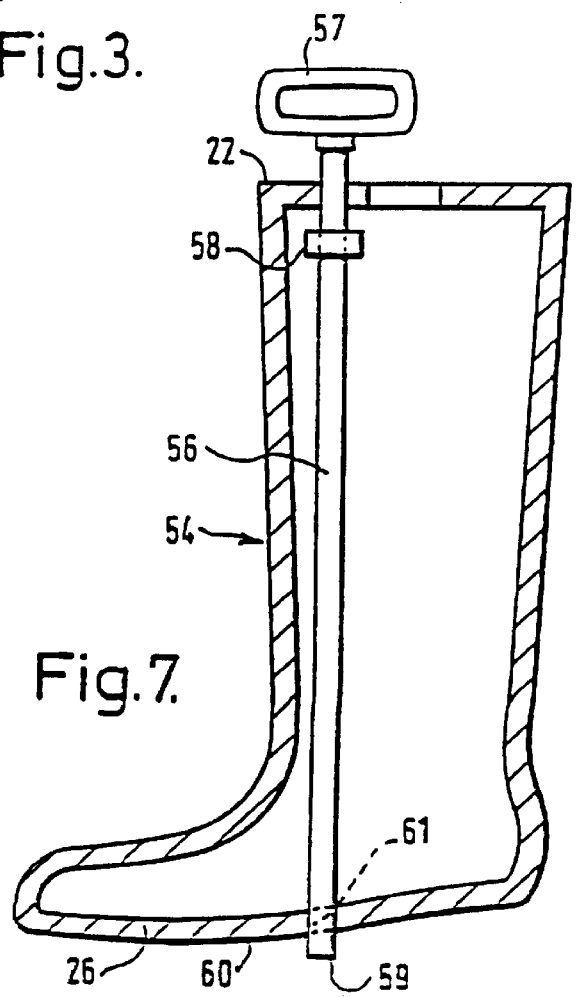
FIG. 7 is a vertical cross-section through a last.

An alternative last 54 is shown in FIG. 7. In the embodiment, a projection in effect is provided on the last and is arranged to be received in a suitably shaped opening defined in a first sole plate so that the last can be supported by the sole plate. More particularly, the last 54 is hollow and it includes a rod 56 having a handle 57. The rod is slidable within a collar 58 provided towards leg end 22 of the last and an opening 61 in the foot end 26.

In use as part of a mould, during a first injection of PU, the rod 56 is extended so that it engages the opening in the first sole plate and, accordingly, a hole is formed in the inner sole as described above with reference to FIG. 6. Next, the first sole plate is replaced with a second sole plate as before. However, in this case, there is no need to plug the opening with a disc 40 of material. Instead, the rod 56 is retracted using handle 57 to a predetermined position wherein the end 59 of the rod 56 is flush with the outer wall 60 of the last. The outer sole may then be formed as before in which case PU fills the hole formed in the first injection. In an alternative embodiment (not shown), a rod similar to rod 56 may be associated with the first sole.

Figure 8:
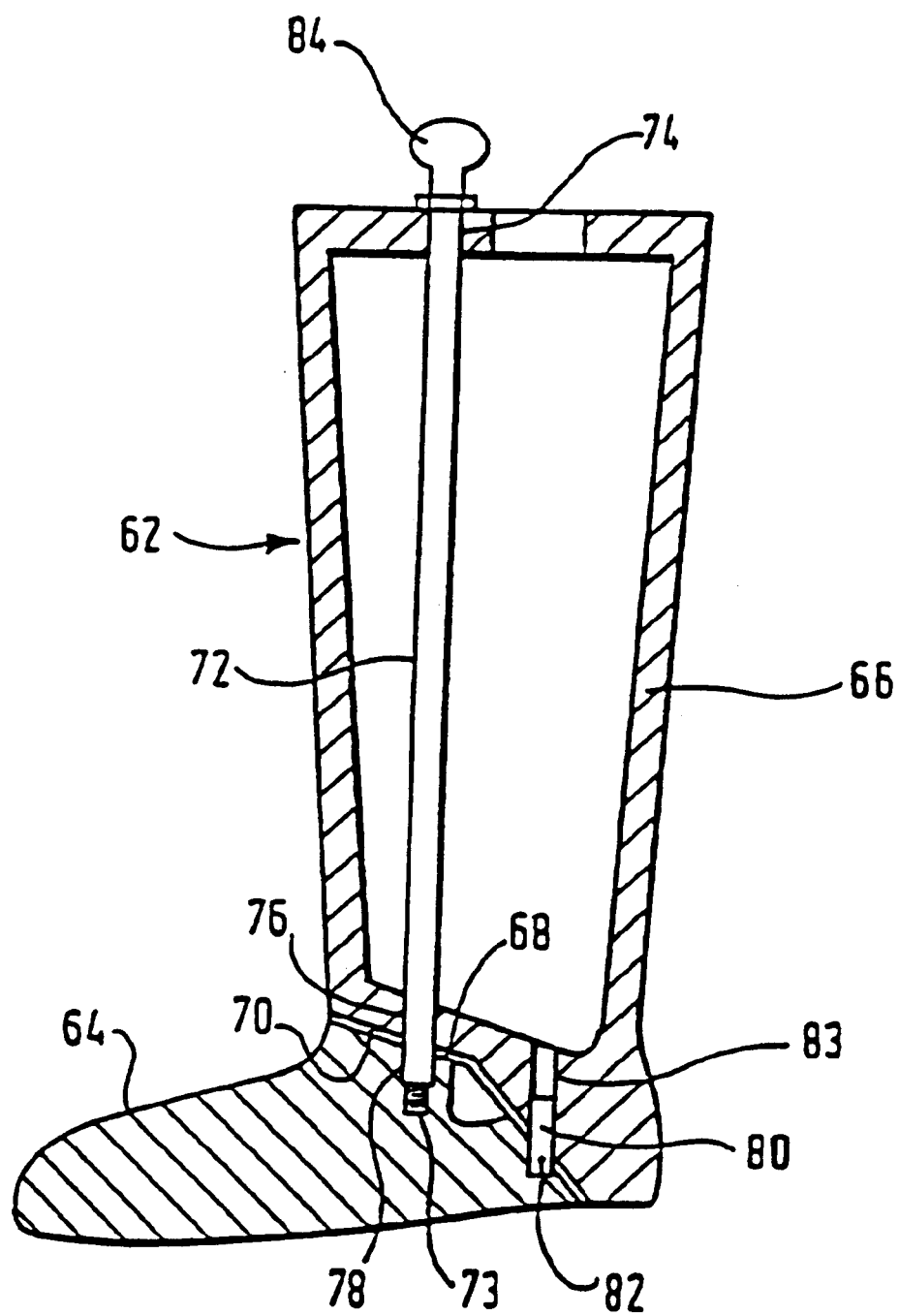
FIG. 8 is a vertical cross-section through another last.

In some cases, for example when a boot is large and/or includes steel toe caps, it is difficult to withdraw a last from the moulded boot at the end of the process. This problem is addressed in the embodiment of FIG. 8, wherein a last 62 includes a generally solid foot part 64 and a generally hollow leg part 66 which are releasably securable to one another. In this regard, the foot part and leg part include respective abutting shaped surfaces 68, 70. A rod 72 having a screw threaded end 73 extends through aligned openings 74, 76 in the leg part 66 and is secured in a screw-threaded opening 78 in the foot part 64. A dowel 80 is received in aligned openings 82, 83 in the foot part 64 and leg part 66 respectively. A locking bolt 84 is provided for rigidly securing the foot and leg parts together.

The last 62 may be arranged to cooperate with a projection 32 as in the embodiment of FIGS. 3 to 6 if required.

After an article has been moulded using the last 62, locking bolt 84 is removed and rod 72 retracted. The leg part 66 can then be removed from within the article followed subsequently by the removal of the foot part 64.

Figure 9:
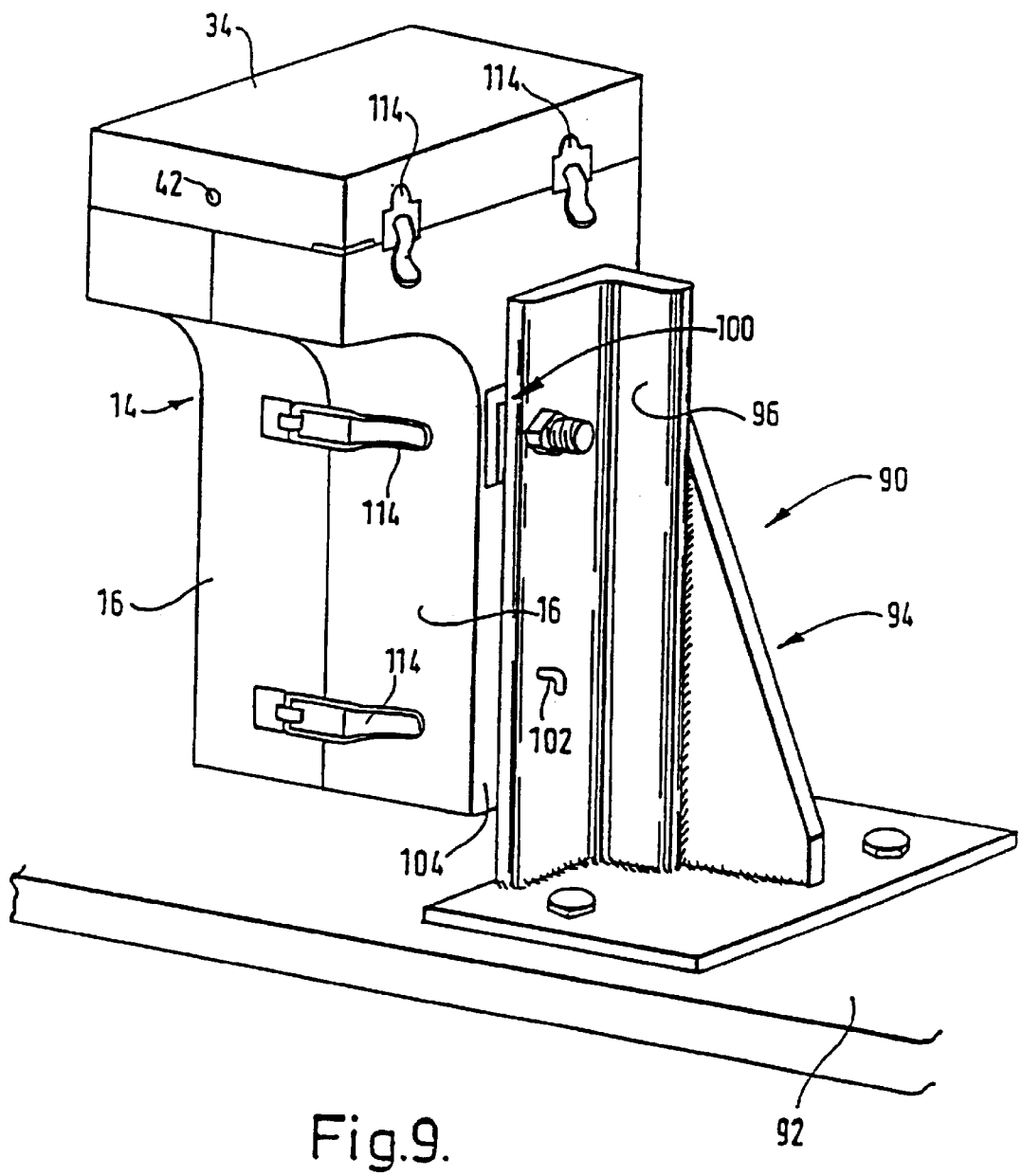
FIG. 9 is a perspective view of a mould support apparatus supporting a mould.
Figure 10:
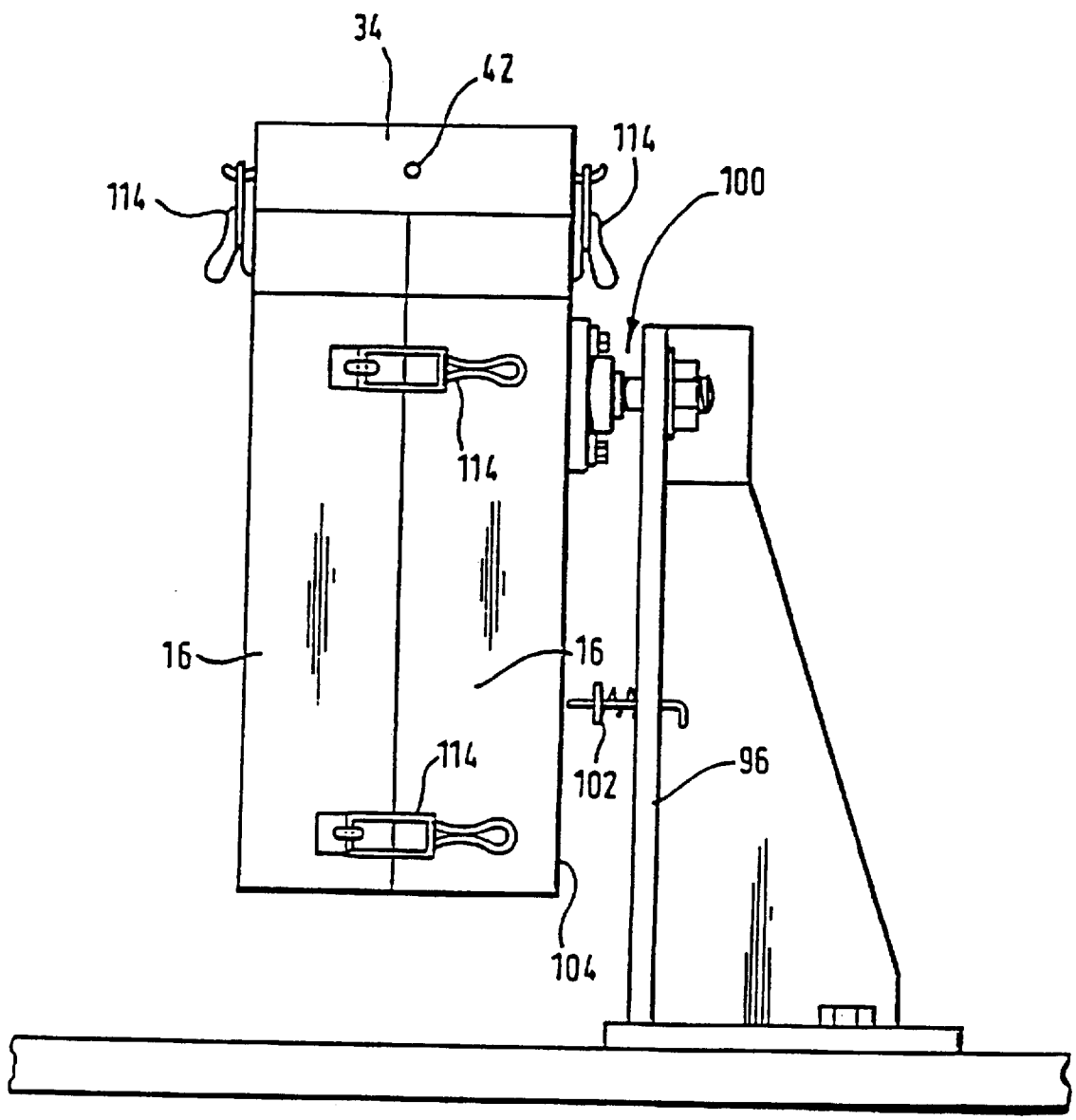
FIG. 10 is a front view of the apparatus of FIG. 9.
Figure 11:
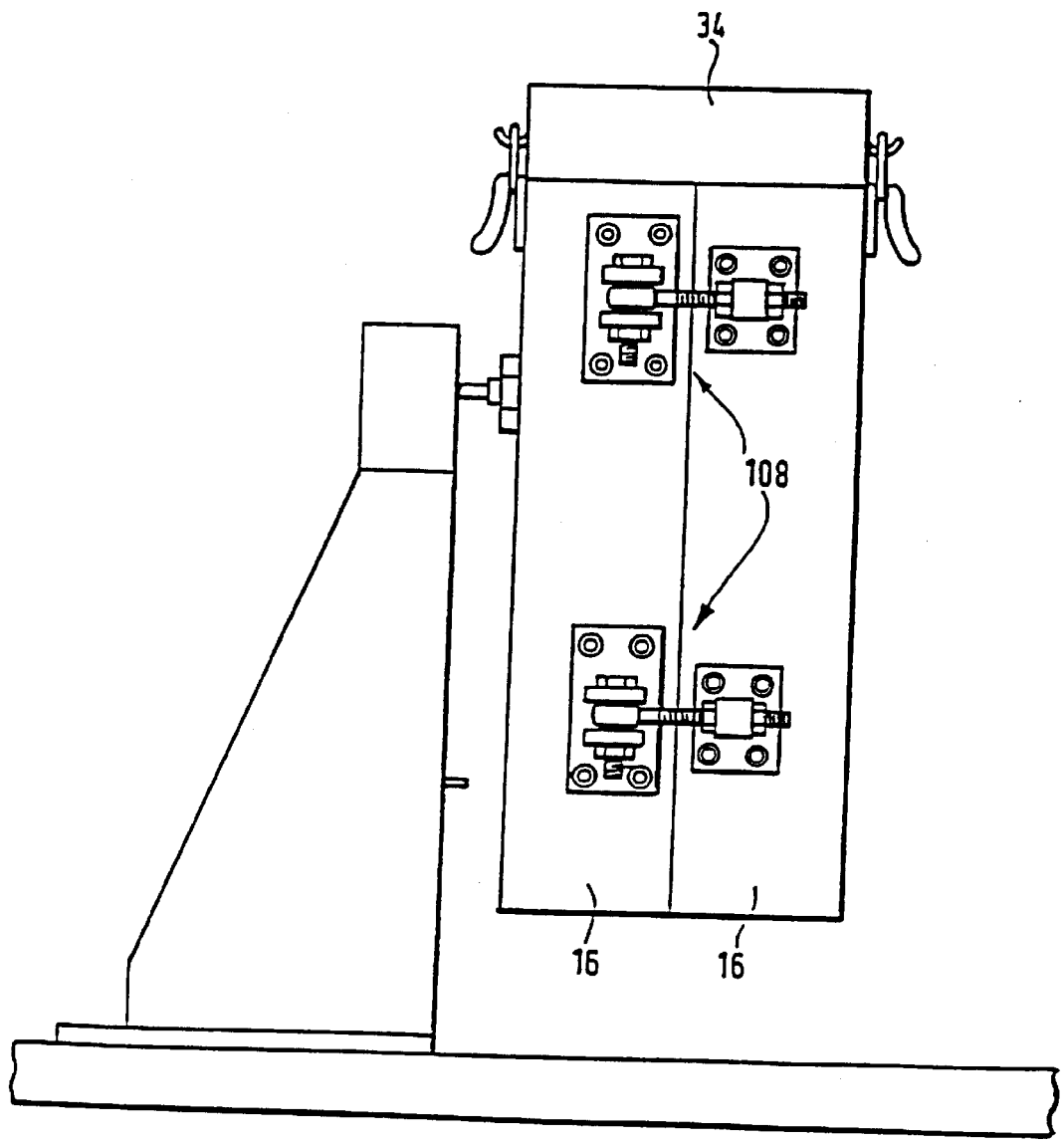
FIG. 11 is a rear view of the apparatus of FIGS. 9 and 10.

Referring now to FIGS. 9 to 11, the mould support apparatus 90 comprises a table 92 to which is bolted a rigid support member 94 having an upstanding member 96. The mould 14 is pivotably mounted, by means of a bearing arrangement 100, on the member 96 so that the mould can be pivoted through 360°. A locking pin 102 is mounted on the upstanding member 96 and is releasably engageable in suitably positioned openings provided in face 104 of the mould so that the pin 102 can be used to lock the casing in a desired position.

The mould halves 16 of the mould are pivotally mounted relative to one another by respective U-bolt cast aluminium hinges 108.

The mould halves 16, sole plate 34 and last 20 are held together by toggle clamps 114. It is found that such clamps are able to apply sufficient force to keep the parts of the mould together.

The pivotable mounting of the mould enables it to be pivoted to an orientation in which an injection moulding process for a particular article of footwear is optimized. For example, it may be found that, for a particular article of footwear, the first injection of PU is best undertaken with the mould in the position shown in FIG. 9, whereas the second injection, to form the outer sole, is best undertaken with the mould pivoted through 90° relative to the FIG. 9 position. The apparatus 90 can easily accommodate such situations and, accordingly, the injection moulding processes can be optimised, whereas when a mould is in a fixed position as in known apparatus, a compromise orientation must be selected.

Stages in the manufacture of an article of footwear are shown in FIG. 12. With mould 14 assembled and held together by toggle clamps 114 and supported by apparatus 90, PU is injected into the mould via passageway 42 (FIG. 12(a)). Then, sole plate 34 is removed. A second sole plate 116 is then secured in position and the outer sole is formed by a further injection of PU (FIG. 12(b)). The second sole plate 116 is removed, the mould halves 16 pivoted relative to one another to open the mould and the last 20 (having the article of footwear thereon) is removed (FIG. 12(c)). In order to increase the rate of manufacture of articles, a second last (having a sock fitted thereto) may be fitted into the mould and the steps of FIGS. 12(a) to 12(c) repeated whilst, at the same time, the removed last 20 may be taken to a second support apparatus 120 whereupon the article of footwear can be removed with the aid of air injected into the last via tube 24 (FIG. 12(d)). The last may then be covered with a sock 126 for subsequent use.

Referring now to FIG. 13, the assembly apparatus 128 comprises drums 130 containing PU which are seated on hot plates and are arranged to deliver heated PU to respective injector devices 132. Each device 132 includes a nozzle 134 via which PU may be injected at pressure to a desired location.

A table 136 is arranged between the devices 132. It has a central area 138 which includes triangular end regions 140 and respective end members 142 which are pivotably mounted, at respective pivot points 144, on the central area so that the members 142 can be pivoted through 180° as represented by arrows 146. The central area 138 includes twelve moulds 14 wherein two moulds are supported on each support member 94. Each end member 142 includes four moulds supported in a similar manner.

In use, a first operator can inject PU into each of the moulds 14 using nozzle 134a when end members 142 are suitably arranged. After this first injection of PU has cured for 3 minutes, the sole plates of each mould are replaced with second sole plates and, then, a second operator injects PU (which may have a different formulation and/or colour to the PU of the first injection) into each of the moulds 14 using nozzle 134b, with end members 142 suitably arranged.

The apparatus 128 is arranged to optimise the use of space and to be serviceable with a minimum number of operators. Various other suitable arrangements are also possible.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An apparatus for manufacturing a complete article of waterproof footwear by moulding, said apparatus comprising:
    a mould having a foot end and a leg end; and
    a last means arranged in a cavity defined by said mould;
    wherein restrictor means is provided between a foot end of said mould and a foot end of said last means for supporting said last means and for restricting relative movement between said mould and said last means, said restrictor means comprising a male formation provided on one of said mould and said last means arranged to be engaged with a female formation provided in the other one of said mould and said last means.

2. An apparatus according to claim 1, wherein said mould includes a first sole member used to form an inner sole of said article of footwear, said first sole member being interchangeable with a second sole member which is used to form an outer sole of said article of footwear.

3. An apparatus according to claim 2, wherein said restrictor means comprises a projection provided on said first sole member which engages with an opening in a sole part of said last means.

4. An apparatus according to claim 1, wherein said restrictor means comprises a rod which is housed within said last means and extensible therefrom to engage with a hole provided in said mould.

5. An apparatus according to claim 1, wherein said last means includes a generally solid foot part and a generally hollow leg part which are releasably securable to one another.

6. An apparatus according to claim 1, further comprising a mould support and a multiplicity of moulds supported thereby, wherein said moulds are pivotable relative to said mould support so that the orientation of each mould can be adjusted.

7. A method for manufacturing a complete article of waterproof footwear by moulding from polyurethane, said method comprising:
    in a first moulding process, manufacturing a first footwear moulding with a hole therein using a mould restrictor means provided between a foot end of said mould and a foot end of a last means for supporting said last means and for restricting relative movement between said mould and said last means, said restrictor means comprising a male formation provided on one of said mould and said last means arranged to be engaged with a female formation provided in the other one of said mould and said last means, which restrictor means causes the production of said hole; and
    wherein said hole is plugged with a plug member prior to a second moulding process,
    in the second moulding process, covering or filling said hole.

8. A method according to claim 7, wherein in said first moulding process a first sole member is used to produce an inner sole of said article of footwear and in said second moulding process a second sole member which is different to said first sole member is used to produce an outer sole of said article of footwear.

* * * * *